Figure 1:
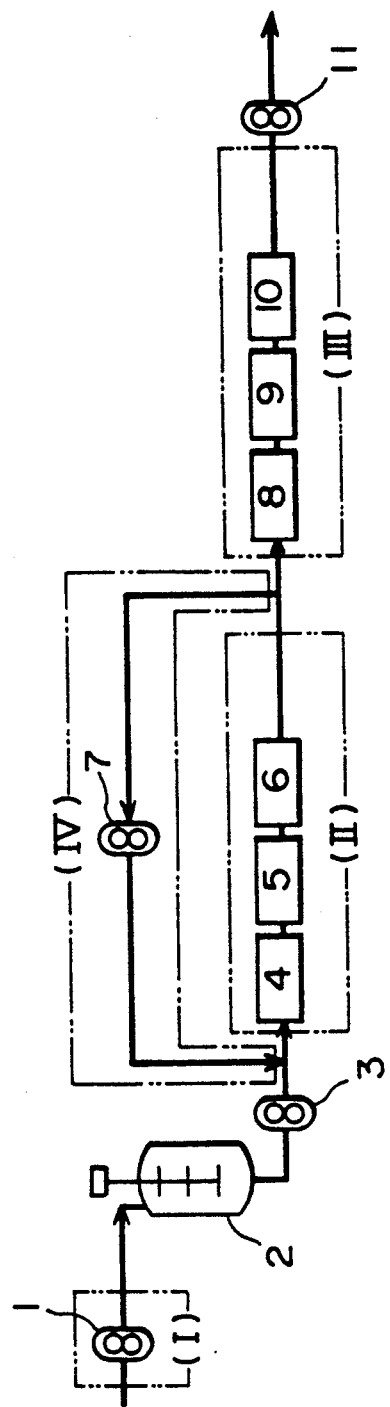

United States Patent [19]
Morita et al.

[11] Patent Number: 5,256,732
[45] Date of Patent: * Oct. 26, 1993

[54] METHOD FOR THE CONTINUOUS BULK POLYMERIZATION FOR IMPACT RESISTANT STYRENE RESIN

[75] Inventors: Tsuyoshi Morita, Chiba; Kimikazu Nakamura, Sakura, both of Japan

[73] Assignee: Dainippon Ink and Chemicals, Inc., Tokyo, Japan

[*] Notice: The portion of the term of this patent subsequent to Aug. 28, 2007 has been disclaimed.

[21] Appl. No.: 743,895

[22] Filed: Aug. 12, 1991

[30] Foreign Application Priority Data

Aug. 13, 1990 [JP] Japan .................... 2-211589

[51] Int. Cl.⁵ .................................. C08F 27/02
[52] U.S. Cl. .................................. 525/52; 525/53; 525/54
[58] Field of Search ..................... 525/52, 53, 54

[56] References Cited

U.S. PATENT DOCUMENTS 4,952,627  8/1990  Morita et al. .......................... 525/52

FOREIGN PATENT DOCUMENTS 0254304  1/1988  European Pat. Off. .
0307238  3/1989  European Pat. Off. .
0373883  6/1990  European Pat. Off. .

*Primary Examiner*—John Kight, III
*Assistant Examiner*—Duc Truong
*Attorney, Agent, or Firm*—Sherman and Shalloway

[57] ABSTRACT

An impact resistant styrene resin is prepared by the continuous bulk polymerization of a styrene monomer in the presence of a second component having a 5 wt % styrene solution viscosity which may be polybutadiene, styrene-butadiene copolymerization rubber, or mixtures thereof. Preliminary polymerization is carried out in a reactor having a dynamic mixing structure and which is integrated between and connected to the material feed line and the initial-stage polymerization line.

27 Claims, 3 Drawing Sheets

METHOD FOR THE CONTINUOUS BULK POLYMERIZATION FOR IMPACT RESISTANT STYRENE RESIN

This invention relates to a continuous bulk polymerization method for an impact resistant styrene resin, and more detailedly relates to a method for preparing an impact resistant styrene resin excellent in impact strength and gloss and having a small gloss gradient.

In preparing an impact resistant styrene resin by graft polymerizing a styrene monomer in the presence of a rubbery polymer, it is particularly important for the determination of the quality of the resulting resin to uniformly disperse the rubbery polymer in a fine particle state and to stabilize the once formed rubber particles. Particularly, the particle size and distribution of the grafted rubbery polymer dispersed in the final resin, graft ratio of the styrene monomer and the like have a great influence on the gloss and impact strength of the product.

Heretofore, as methods for the industrial preparation of impact resistant polystyrene, a bulk-suspension polymerization method and a continuous bulk polymerization method have generally been adopted, but the superiority of the continuous method in productivity and economical efficiency is admitted, and the continuous bulk polymerization method is becoming the main current.

Usually, in the continuous bulk polymerization method, a preparation method, wherein polymerization is carried out by continuously feeding a raw material solution to several connected stirred tank reactors, is generally adopted, as proposed in Japanese Laid-Open Patent Publication No. 28407/1985.

However, as for this continuous bulk polymerization method, drawbacks accompanying dynamic mixing by the agitator are pointed out. Namely, when the viscosity of the polymerization liquid in the reactor increase in proportion to the progress of polymerization, it becomes necessary to increase power for sustaining the agitation and the strength of the agitating blade. Further, when excessive agitation and mixing are carried out in order to make the rubbery polymer fine particle, extra shearing force is exercised on the once dispersed rubbery polymer, and therefore extra destruction of the dispersed particles of the rubbery polymer takes place, particle size distribution becomes wider and as a result a lowering of the impact strength and gloss of the product is caused.

Thus, for the purpose of improving such faults, several proposals have been made in this polymerization method such as the improvement of the agitation blade, the adoption of a tubular reactor having an agitator and the adoption of a circulating line, but any sufficiently satisfactory means therefor has not yet appeared.

For example, in U.S. Pat. No. 3,660,535, the dispersion and fine particle size of the rubbery polymer are controlled by agitating and circulating the polymerization liquid using a so-called circulating polymerization line wherein polymerization is proceeded with while the polymerization liquid passed through a polymerization line comprising a tubular reactor is circulated again to the initial-stage polymerization line, and using a tower type reactor having an agitator. However, in this method, there is a tendency that when the circulation amount is increased in order to uniformly disperse the rubbery polymer, the average particle size enlarges. Therefore, when it is tried to obtain the resin having a small average particle size of the rubbery polymer in the product and having a small distribution thereof, it is compelled to rely on a usual means wherein the circulation amount is decreased and the revolution number of the agitator is increased, and as a result the lowering of the strength and gloss of the product is caused.

On the other hand, in the progress of the replacement of expensive ABS resins by impact resistant polystyrenes on the market aiming at the cost reduction of plastics, requirement for resins excellent in physical property balance between gloss and strength is becoming higher. Particularly as for the gloss of moldings, resins are required having gloss equal to that of ABS resins and having a small gloss gradient, namely resins such that the lowering of gloss from the gate part of the injection moldings to the end part thereof is small.

In order to obtain such a resin, it is necessary to control the average particle size of the rubbery polymer in the product to 1.0 micron or less, but in usual preparation techniques, impact strength strikingly lowers in case of the average grain size of the rubbery polymer being 1.0 micron or less, and thus satisfactory results have not been obtained.

In U.S. Pat. No. 4,952,627, in order to solve the faults accompanying the above continuous bulk polymerization method using an agitation type reactor, a method for the continuous preparation of impact resistant polystyrene is proposed using a tubular reactor inside which plural mixing elements having no moving parts are fixed.

In this method, the stabilization in dispersion of the rubbery polymer is attained by the continuous bulk polymerization of a styrene monomer in the presence of polybutadiene and/or styrene-butadiene copolymerization rubber, which polymerization comprises using a polymerization line composed of an initial-stage polymerization line following a material feed line and comprising at least one tubular reactor inside which plural mixing elements having no moving parts are fixed, a main polymerization line following the initial-stage polymerization line and comprising at least one tubular reactor inside which plural mixing elements having no moving parts are fixed, and a recycle line which branches between the initial-stage polymerization line and the main polymerization line and returns inside the initial-stage polymerization line, recycling much of the initial-stage polymerization liquid flow from the initial-stage polymerization line through the recycle line, and on the other hand polymerizing the non-recycled initial-stage polymerization liquid flow in the main polymerization line. In this method, the control of quality is carried out relating the polymerization conversion of the styrene monomer in the initial-stage polymerization with the concentration of the rubbery polymer.

However, in order to obtain an impact resistant styrene resin having a rubbery polymer average particle size of 1.0 micron or less and excellent in gloss by the method of U.S. Pat. No. 4,952,627, it is necessary to suppress the polymerization conversion at the initial-stage polymerization line to 20 wt % or less and increase the recycle ratio R (the ratio F1/F2 of the flow rate F1 of the polymerization liquid recycled, without flowing into the following main polymerization line, at the outlet of the initial-stage polymerization line to the flow rate F2 of the polymerization liquid flowing into the following main polymerization line) to at least 8 or more. In this case, although such a resin having a rubbery polymer average grain size of 0.9 to 1.0 micron is obtained, unfortunately it is impossible to obtain the above-mentioned resin having a small gloss gradient because although the gloss of injection moldings near the gate part is excellent, the gloss at parts apart from the gate part is poor. Further, when a polymerization liquid having a polymerization conversion of 20 wt % at the circulating polymerization line, namely a polymerization liquid having a high unreacted styrene monomer content is fed into the succeeding main polymerization line wherein the tubular reactors are connected in series and polymerization is continued, heat generation strikingly enlarges due to the polymerization of the unreacted styrene monomer at the early part of the main polymerization line and the stable control of polymerization temperature becomes difficult. This makes the dispersion state of the initially formed rubbery polymer particles unstable, and as a result, large rubbery polymer grains are partially formed and the gloss of the product is lost. Such a phenomenon cannot be avoid as the scale of the reactor is enlarged, even if there is no influence in a reactor of a small scale.

Under these circumstances, the present inventors intensely studied, and found that in the practice of the method disclosed in U.S. Pat. No. 4,952,627, a product excellent in impact strength and gloss and further having a relatively diminished gloss gradient can be obtained by integrating between the material feed line and the initial-stage polymerization line a reactor having a dynamic mixing structure and carrying out preliminary polymerization in the reactor under specific conditions, and completed this invention.

Namely, this invention relates to a method for preparing an impact resistant styrene resin by the continuous bulk polymerization of a styrene monomer in the presence of polybutadiene and/or styrene-butadiene copolymerization rubber(s), which comprises using a polymerization line composed of a. a material feed line (I), b. an initial-stage polymerization line (II) following the material feed line (I) and comprising at least one tubular reactor inside which plural mixing elements having no moving parts are fixed, c. a main polymerization line (III) following the initial-stage polymerization line (II) and comprising at least one tubular reactor inside which plural mixing elements having no moving parts are fixed, and d. a recycle line (IV) which branches between the initial-stage polymerization line (II) and the main polymerization line (III) and returns inside the initial-stage polymerization line (II), recycling a major part of the initial-stage polymerization liquid flow from the initial-stage polymerization line (II) through the recycle line (IV), and one the other hand polymerizing the non-recycled initial-stage polymerization liquid flow in the main polymerization line (III) (hereinafter abbreviated as a method for the preparation of an impact resistant styrene resin using a static mixing reactor), the continuous bulk polymerization method for the impact resistant styrene resin wherein the polybutadiene and/or styrene-butadiene copolymerization rubber(s) have(has) a 5 wt % styrene solution viscosity of 10 to 50 cps, a reactor having a dynamic mixing structure is integrated between the material feed line (I) and the initial-stage polymerization line (II), and preliminary polymerization is carried out while dynamic mixing is made in the reactor;

in a method for preparing an impact resistant styrene resin using the static mixing reactor, the continuous bulk polymerization method for the impact resistant styrene resin wherein an agitation type reactor having a double helical type agitating blade is integrated between the material feed line (I) and the initial-stage polymerization line (II), and preliminary polymerization is carried out while dynamic mixing is made in the reactor;

in a method for preparing an impact resistant styrene resin using the static mixing reactor, the continuous bulk polymerization method for the impact resistant styrene resin wherein a reactor having a dynamic mixing structure is integrated between the material feed line (I) and the initial-stage polymerization line (II), and preliminary polymerization is carried out while dynamic mixing is made under a condition such that Reynolds number becomes 2,800 to 4,500 in the reactor; and in a method for preparing an impact resistant styrene resin using the static mixing reactor, the continuous bulk polymerization method for the impact resistant styrene resin wherein the polybutadiene and/or styrene-butadiene copolymerization rubber(s) have(has) a 5 wt % styrene solution viscosity of 10 to 50 cps, an agitation type reactor having a double helical type agitating blade is integrated between the material feed line (I) and the initial-stage polymerization line (II), and preliminary polymerization is carried out while dynamic mixing is made under a condition such that Reynolds number becomes 2,800 to 4,500 in the reactor.

Hereinafter, this invention is detailedly described.

The steps of the polymerization method of the invention are specifically described according to FIG. 1. First, a mixture of a polybutadiene and/or a styrene-butadiene copolymerization rubber with a styrene monomer is flowed into the reactor (2) having a dynamic mixing structure from the material feed line (I), and preliminary polymerization is carried out. The polymerization liquid passed through the reactor having the dynamic mixing structure is then flowed in to the initial-stage polymerization line (II), and initial-stage polymerization is carried out. The outlet of the initial-stage polymerization line (II) branches into two paths, and much of the polymerization liquid after the initial-stage polymerization is brought back into the initial-stage polymerization line (II) through the recycle line (IV) and thus circulated in a circle formed by the initial-stage pqlymerization line (II) and the recycle line (IV) (hereinafter referred to a circulating polymerization line). The remaining polymerization liquid is flowed into the main polymerization line (III) and subjected to main polymerization.

The tubular reactor referred to in the invention is a tubular reactor inside which plural mixing elements having no moving parts are fixed.

The mixing element means a device for mixing the polymerization liquid, for example by dividing the flow of the polymerization liquid flowed into the tube and changing the direction of the flow and repeating division and confluence, and preferably applied in the invention are, for example, a Model SMX or Model SMR Sulzer-type tubular mixer, a Kenix-type static mixer, a Toray-type tubular mixer, a tubular reactor disclosed in U.S. Pat. No. 4,275,177, etc.

An agitation type reactor is suitable as the reactor which is used in the invention and has a dynamic mixing structure. Dynamic mixing is most important particularly for the determination of the particle size of the dispersing rubbery polymer.

In the invention, in order to lower gloss gradient of moldings relating to the distribution of the particle size of the rubbery polymer by adjusting shear exercised on the preliminary polymerization liquid, Reynolds number in an appropriate range is selected.

The optimum range of this Reynolds number varies depending on the scale of the plant, namely on the production capacity. Namely, it is sufficient that the Reynolds number is usually on the order of 100 to 250 in a pilot plant and the like, but in case of a commercial scale of an annual production of the order of 20,000 to 60,000 t per one train and a year, the Reynolds number is preferably 2,800 to 4,300 at 120° to 138° C. Particularly in order to extremely narrow the distribution of the particle size of the rubbery polymer without giving extra shear to the preliminary polymerization liquid, it is preferred that the Reynolds number of the polymerization liquid in the reactor is 3,100 to 4,300 at the pre-polymerization temperature, for example 120° to 138° C.

The preliminary polymerization in the reactor having a dynamic mixing structure is usually carried out so that the polymerization conversion of the styrene monomer at the outlet of the reactor becomes 10 to 28 wt % and above all the range of 14 to 24 wt % is preferred.

The reactor to be used in the invention and having a dynamic mixing structure includes, for example a vessel type or tower type reactor having an agitator capable of giving dynamic mixing within the above range. Usable as an agitating blade is an anchor type, turbine type, screw type, double helical, type or another type agitating blade. Included among the reactors used in pre-polymerizatron in the invention, is a reactor using a double helical type agitating blade which is particularly preferred because it can efficiently disperse the rubbery polymer and thus can attain the enhancement of strength and the decrease of the gloss gradient.

In the circulating polymerization line used in the invention, the polymerization conversion of the styrene monomer at the outlet of the circulating polymerization line is usually 35 to 55 wt %, and the value of 40 to 50 wt % is preferred from the viewpoint that the gloss of the product is enhanced while the partial formation of large rubbery polymer particles is suppressed. In this case, it is suitable that the polymerization temperature in the circulating polymerization line is 130° to 145° C.

Since the particle of the rubbery polymer in the polymerization liquid are stabilized in this region and the particle size is also being settled, the recycle ratio R of the polymerization liquid at the circulating polymerization line and the polymerization conversion of the styrene monomer become important factors. As for the recycle ratio R, when the flow rate of the initial-stage polymerization liquid recycled in the circulating line without flowing into the main polymerization line (III) is expressed as F1 (l/hour) and the flow rate of the initial-stage polymerization liquid flowing into the main polymerization line (III) from the circulating line is expressed as F2 (l/hour), R (=F1/F2) is usually in the range of 3 to 15, and the range of R =5 to 10 is particularly preferred because pressure drop in the tubular reactor is small, the formed rubbery polymer particle is stable and it is possible to make the particle size small.

The polymerization liquid after polymerization in the circulating polymerization line is then fed into the main polymerization line (III) and usually continuously polymerized at a reaction temperature of 140° to 170° C. until the conversion of the styrene monomer reaches 70 to 90 wt %.

Then, the unreacted monomer and the solvent of the polymerization liquid are evaporated under reduced pressure in a devolatilizer and then pelletized to give a dried impact resistant styrene resin.

The number of tubular reactors integrated in the initial-stage polymerization line (II) and the main polymerization line (III) varies depending, in case of a tubular reactor as above, on its length, the structure of the mixing element, etc. and is not particularly limited, but 4 to 15, preferably 6 to 10 tubular reactors having 4 or more mixing elements are used in combination. Among them, the number of the tubular reactors integrated in the initial-stage polymerization line (II) is usually 1 to 10 and preferably 2 to 6.

Representative examples of the polybutadiene and styrene-butadiene copolymerization rubbers used in the invention include polybutadiene rubber, styrene-butadiene copolymerization rubber, styrene-butadiene-styrene block copolymerization rubber, etc. Among them polybutadiene and styrene-butadiene copolymerization rubbers having a 5 wt % styrene solution viscosity (5% SV) of 10 to 50 cps are preferred because an impact resistant styrene resin can be obtained having a small particle size, excellent gloss and impact resistance, and particularly having an extremely small particle size distribution and a diminished gloss gradient. Preferred among them are polybutadiene and styrene-butadiene copolymerization rubbers having a 5 wt % styrene solution viscosity (5% SV) of 15 to 30 cps because they can give a further diminished gloss gradient. Particularly preferred as the styrene-butadiene copolymerization rubber is one composed of 1 to 10 wt % of styrene and 90 to 99 wt % of butadiene, and any of random bond and block bond may be used as the bond mode between styrene and butadiene.

The content of the rubbery polymer in the resin is in a range of 20 weight parts or less per 100 weight parts of the resin component.

The average rubber particle size in impact resistant styrene resins obtained by the invention is usually 0.5 to 2.0 microns, and the range of 0.7 to 1.0 micron is preferred in order to remarkably enhance the gloss and gloss gradient.

Styrene monomers used in the invention generally include styrene, α-methylstyrene, styrene derivatives wherein the hydrogen atom(s) on the benzene nucleus is/are substituted with halogen atom(s) or alkyl group(s) having 1 to 4 carbon atoms. Representative examples of such styrene monomers include styrene, o-chlorostyrene, p-chlorostyrene, p-methylstyrene, 2,4-dimethylstyrene, t-butylstyrene, etc., and styrene is most preferred.

In the invention, it is further possible to use together with the styrene monomer another monomer copolymerizable therewith.

In bulk polymerization in the invention, it is also possible to use an appropriate amount of a solvent, for example for the adjustment of the viscosity of the polymerization liquid. Examples of such solutions include toluene, ethylbenzene, xylene, etc. The use amount of the solvent is usually in a range not more than 20 weight parts per 100 weight parts of the raw material liquid comprising the rubbery polymer and the styrene monomer. It is also possible to add to the feed material liquid used in the invention, if necessary as a polymerization initiator a known organic peroxide which releases free radical(s) when decomposed such as, for example, 1,1-di-t-butylperoxycyclohexane, t-butyl peroxybenzoate, di-t-butyl peroxide or t-butylperoxyisopropylcarbonate. Further if necessary, it is also to use together therewith known additives, for example a plasticizer such as mineral oil, an antioxidant, a chain transfer agent, a mold releasing agent such as a long-chain fatty acid or an ester or metal salt thereof, silicone oil, etc.

The impact resistant styrene resin obtained by the polymerization method of the invention can give moldings which are excellent in gloss and impact strength and have a small gloss gradient. Namely, the resin has a characteristic such that the ratio of glossiness between the gate part and end part of a molding obtained by injection molding the resin is small, i.e. 1.01 to 1.13. According to usual techniques, it is necessary, in advance, to prepare polymerization liquids having a different rubber particle size and mix them in a polymerization vessel or blend them in an extruder or the like, and thus the lowering of productivity and cost increase cannot be avoided. On the other hand, it can be said that this invention is an excellent continuous bulk polymerization method because dynamic mixing and static mixing are skillfully utilized particularly in the region where rubber particles at the initial stage of polymerization are formed and the control of the particle size and strength increase are simultaneously attained.

Resins obtained by the invention are suitable for moldings, in the fields of cleaner housing, air-conditioner housing, miscellaneous goods, etc., of which surface gloss equal to ABS resins is required.

EXAMPLES

This invention is further specifically described below referring to examples and comparative examples together with drawings. In this connection, all the parts in the examples and comparative examples denote weight parts and all the % except the gloss value denote weight %.

Physical property values therein were measured as follows.

(1) Average particle size of the rubbery polymer in the resin

A volume average particle size was determined by a Coulter counter (Model TA-II produced by Coulter Electronics Inc.) using an electrolytic solution consisting of dimethylformamide and ammonium thiocyanate.

(2) Izod impact value
Determined according to JIS K-6871.

(3) Gloss and gloss gradient

A dumbbell specimen was prepared by injection molding and the gloss of the plain face at the gate part side of the specimen and the gloss of the plain face at the end part side were measured according to JIS Z-8741 (incident angle: 60°). Then, (the gloss of the gate part side plain face)/(the gloss of the end part side plain face) is calculated as a gloss gradient.

Figure 2:
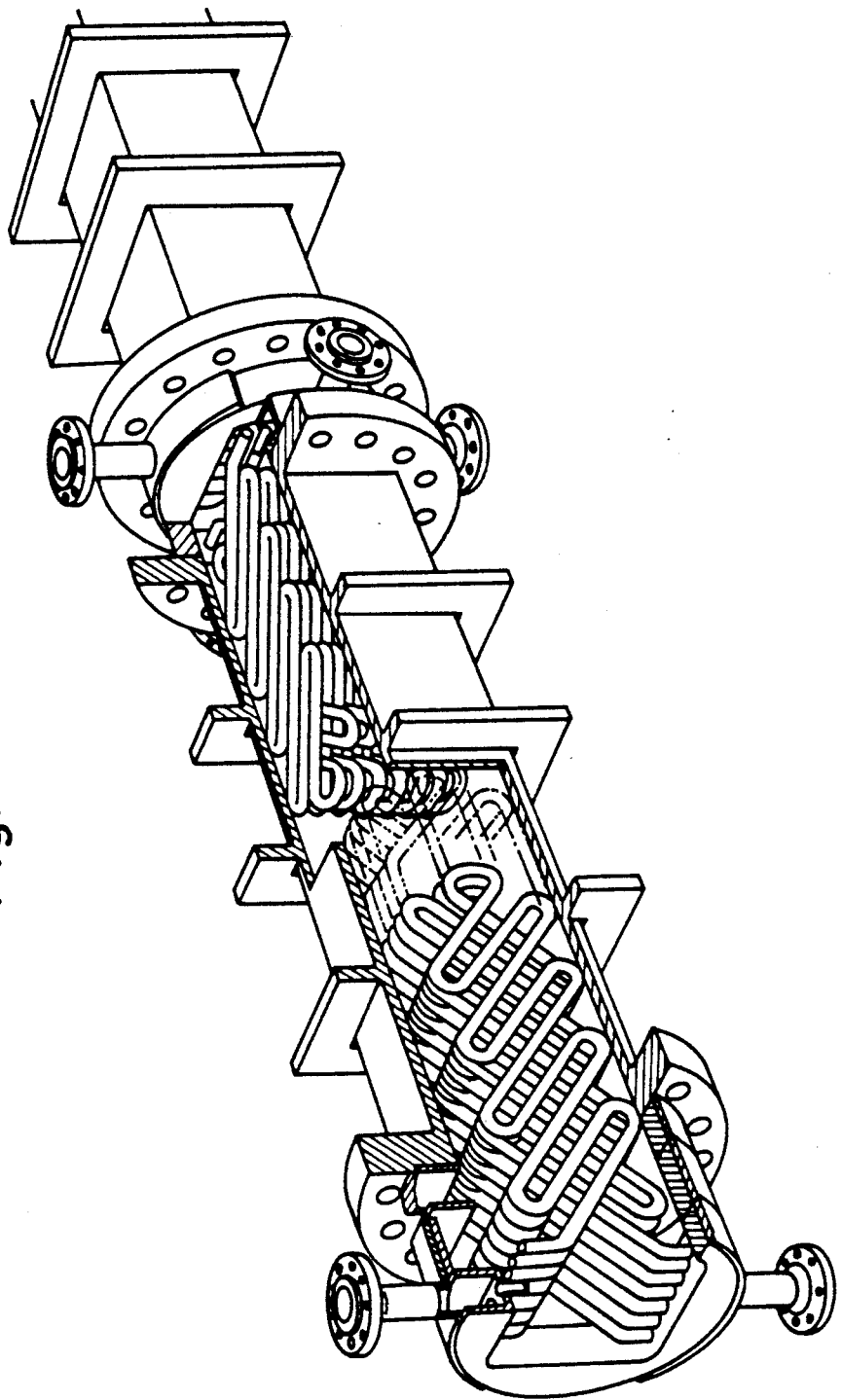
Figure 3:
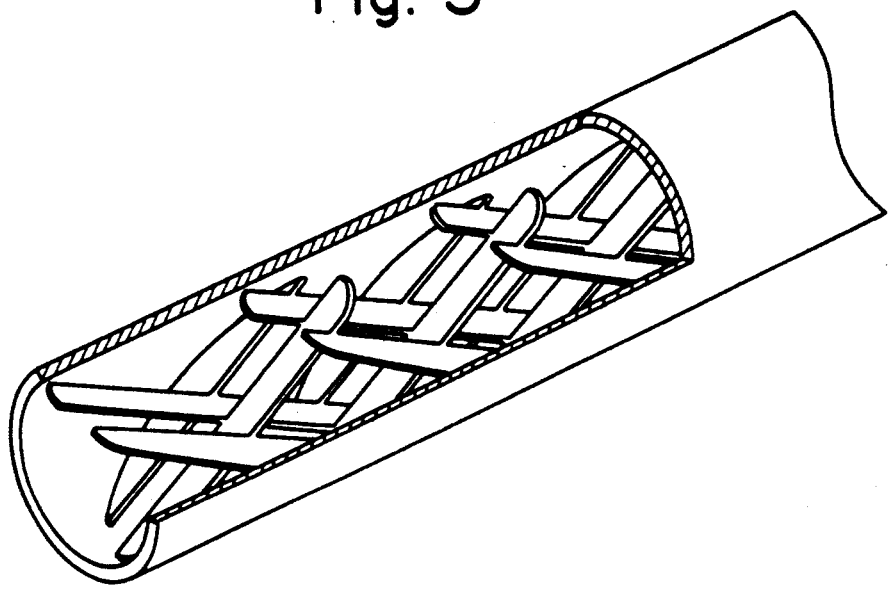
Figure 4:
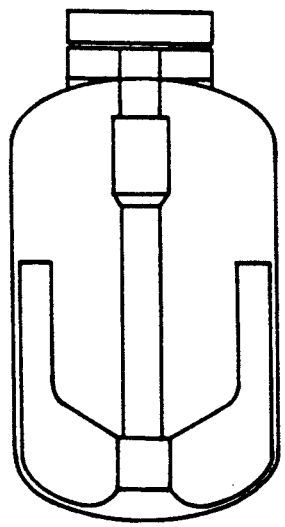
Figure 5:
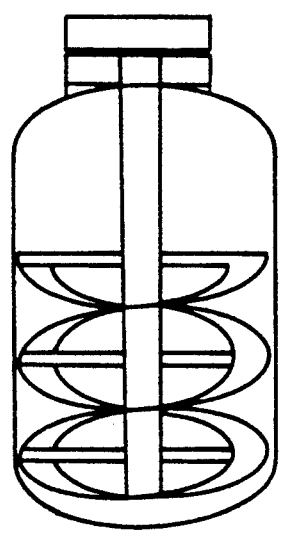

In the drawings, FIG. 1 is a flow sheet showing an example of the polymerization apparatus used in the polymerization method of the invention, FIG. 2 and FIG. 3 are a partly omitted birds-eye view of tubular reactors inside which plural mixing elements are fixed, FIG. 4 is a schematic drawing of an agitation type reactor having an anchor type agitating blade, and FIG. 5 is a schematic drawing of an agitation type reactor having a double helical type agitating blade.

EXAMPLE 1

In this example, an apparatus was used wherein the arrangement was made as shown in FIG. 1. A material liquid containing a styrene monomer, a rubbery polymer and a solvent is fed preliminary in a 20-L agitation type reactor (2) by a plunger pump (1) in the material feed line (I) and subjected to pre-polymerization under dynamic mixing. The pre-polymerization liquid is then transferred into the circulating polymerization line by a gear pump (3). The circulating polymerization line is composed of the initial-stage polymerization line (II) comprising tubular reactors (4), (5) and (6) having an inner diameter of 2.5 inches (a model SMX static mixer produced by Sulzer Brothers Limited, Switzerland and containing 30 mixing elements, refer to FIG. 1) and the recycle line (IV) comprising a gear pump (7) for circulating the polymerization liquid, in this order from the inlet. An outlet leading to the main polymerization line (III) is arranged between the tubular reactor (6) and the gear pump (6). In the main polymerization line the same tubular reactors (8), (9) and (10) and gear pump as above are connected in series in this order from the inlet.

A material liquid consisting of 7 parts of polybutadiene having a 5% SV of 45 cps, 93 parts of styrene monomer and 6 parts of ethylbenzene was prepared and continuously bulk polymerized under the following conditions using the above apparatus. However, a reactor using an anchor type agitating blade and as shown in FIG. 4 was used as the agitation type reactor.

Continuous feed amount of the material liquid 12 L/hr Reaction temperature in the agitation type reactor (2) 134° C. Reynolds number in the agitation type reactor (2) Re = 130 Reaction temperature in the circulating polymerization line 136° C.

Reaction temperature in the non-circulating polymerization line 150° to 170° C.

In the above, Reynolds number in the agitation type reactor (2) was calculated by the following equation 1.

$$Re = (d^2 N p)/\mu \quad \text{Equation 1}$$

(in Equation 1, d represents a blade diameter (m) of the agitating blade, N represents an agitation revolution number (r/sec), p represents the density (Kg/cm³) of the reaction liquid in the agitation type reactor (2), and $\mu$ represents the viscosity (Kg/m.sec) of the reaction liquid in the agitation type reactor (2).).

The obtained polymerization liquid was heated up to 230° C. by the heat exchanger, evaporation of volatile components under a reduced pressure of 50 mmHg, and molten, kneaded and polletized by an extruder to obtain an impact resistant styrene resin. The polymerization conditions and measurement results on various physical properties are shown in Table 1.

EXAMPLE 2

The same procedure as in Example 1 was made except that a material liquid consisting of 8 parts of low cis-polybutadiene having a 5% SV of 25 cps, 92 parts of styrene monomer and 6 parts of ethylbenzene was used and Reynolds number in the agitation type reactor (2) was adjusted to 210, and thereby an impact resistant styrene resin was obtained. The polymerization conditions and measurement values on various physical properties are shown in Table 1.

EXAMPLE 3

The same procedure as in Example 1 was conducted except that the agitating blade of the agitation type reactor (2) was changed from the anchor type to a double helical type as shown in FIG. 3 and Reynolds number in the agitation type reactor (2) was adjusted to 150, and thereby an impact resistant styrene resin of the invention was obtained. This was a resin such that a molding from it has a small gloss gradient and a good appearance. The polymerization conditions and measurement results on various physical properties are shown in Table 1.

EXAMPLE 4

The same procedure as in Example 2 was conducted except that a styrene-butadiene copolymerization rubber having a 5% SV of 25 cps and containing 5% of styrene was used in place of the low cis-polybutadiene having a 5% SV of 25 cps, a double helical type agitation type reactor of FIG. 5 was used in place of the anchor type agitation type reactor and Reynolds number in the agitation type reactor (2) was adjusted to 214, and thereby an impact resistant styrene resin of the invention was obtained. The polymerization conditions and measurement results on various physical properties are shown in Table 1.

EXAMPLE 5

The same procedure as in Example 2 was conducted except that a 10-$m^3$ agitation type reactor having a double helical type agitating blade was used in place of the 20-L agitation type reactor (2) having the anchor type agitating blade, a tubular reactor having an inner diameter of 900 mm (a model SMR Static mixer produced by Sulzer Brothers Limited, Switzerland; refer to FIG. 2) was used in place of the tubular reactor having an inner diameter of 2.5 inches, the feed amount of the material liquid was changed to 6,000 L/hour and Reynolds number in the agitation type reactor (2) was adjusted to 3950, and thereby an impact resistant styrene resin was obtained. The polymerization conditions and measurement results on various physical properties are shown in Table 1.

EXAMPLE 6

The same procedure as in Example 5 was conducted except that Reynolds number in the agitation type reactor (2) was adjusted by adjusting the agitation revolution number therein, and thereby an impact resistant styrene resin of the invention was obtained. The polymerization conditions and measurement results on various physical properties are shown in Table 1.

COMPARATIVE EXAMPLE 1

The same procedure as in Example 1 was conducted except that the material liquid was directly fed into the circulating polymerization line with the gear pump (3) without using the agitation type reactor (2), and thereby an impact resistant styrene resin was obtained. In this case, the polymerization conversion of the styrene monomer at the outlet of the circulating polymerization line was 25%. The polymerization conditions and measurement results on various physical properties are shown in Table 1.

COMPARATIVE 2

The same procedure as in Example 1 was conducted except that the material liquid was directly fed, without using the agitation type reactor (2), into the circulating polymerization line using the gear pump (3), the recycle ratio R at the circulating polymerization line was changed to 12 and the reaction temperature was changed to 130° C., and thereby an impact resistant styrene resin was obtained.

In this case, the polymerization conversion of the styrene monomer at the outlet of the circulating polymerization line was as low as 16% and heat generation increased in the succeeding non-circulating polymerization line, and therefore the reaction temperature was maintained by raising the cooling capacity of the tubular reactor up to near its limitation. The polymerization conditions and measurement results on various physical properties are shown in Table 1.

COMPARATIVE EXAMPLE 3

The same procedure as in Example 2 was conducted except that the material liquid was directly fed, without using the agitation type reactor (2), into the circulating polymerization line using the gear pump (3), the recycle ratio R at the circulating polymerization line was changed to 10 and the reaction temperature was changed to 131° C., and thereby an impact resistant styrene resin was obtained.

In this case, since the polymerization conversion of the styrene monomer at the outlet of the circulating polymerization line was as low as 18% and heat generation increased in the succeeding non-circulating polymerization line, the reaction temperature was maintained by raising the cooling capacity of the tubular reactor up to near its limitation. The polymerization conditions and measurement results on various physical properties are shown in Table 1.

COMPARATIVE EXAMPLE 4

The same procedure as in Example 1 was conducted except that the material liquid was directly fed, without using the agitation type reactor (2), into the circulating polymerization line using the gear pump (3) and low cis-butadiene having a 5% SV of 85 cps was used, and thereby an impact resistant styrene resin was obtained. The polymerization conditions and measurement results on various physical properties are shown in Table 1.

COMPARATIVE EXAMPLE 4

The same procedure as in Example 1 was conducted except that the material liquid was directly fed, without using the agitation type reactor (2), into the circulating polymerization line using the gear pump (3), and thereby an impact resistant styrene resin was obtained The polymerization conditions and measurement results on various physical properties are shown in Table 1.

TABLE 1

| Item | Unit | Example | | | | | | Comparative example | | | | |
|---|---|---|---|---|---|---|---|---|---|---|---|---|
| | | 1 | 2 | 3 | 4 | 5 | 6 | 1 | 2 | 3 | 4 | 5 |
| Polymerization conditions | | | | | | | | | | | | |

TABLE 1-continued

| Item | Unit | Example 1 | Example 2 | Example 3 | Example 4 | Example 5 | Example 6 | Comparative example 1 | Comparative example 2 | Comparative example 3 | Comparative example 4 | Comparative example 5 |
|---|---|---|---|---|---|---|---|---|---|---|---|---|
| 5% SV of the rubbery polymer | CPS | 45 | 25 | 45 | 25 | 25 | 25 | 45 | 45 | 25 | 85 | 60 |
| Agitation type reactor | | | | | | | | | | | | |
| Agitating blade | — | Anchor type | Anchor type | Double helical type | Double helical type | Double helical type | Double helical type | — | — | — | — | — |
| Reynolds number | — | 130 | 210 | 150 | 214 | 3950 | 3380 | — | — | — | — | — |
| Polymerization conversion at the outlet | % | 18 | 22 | 18 | 21 | 22 | 23 | — | — | — | — | — |
| Circulating polymerization line | | | | | | | | | | | | |
| Recycle ratio R | — | 8 | 6 | 8 | 6 | 6 | 6 | 8 | 12 | 10 | 12 | 12 |
| Polymerization conversion at the outlet | % | 42 | 48 | 42 | 46 | 48 | 48 | 25 | 16 | 18 | 16 | 16 |
| Content of the rubbery polymer | % | 7.5 | 8.5 | 7.5 | 8.5 | 8.5 | 8.5 | 7.5 | 7.5 | 8.5 | 7.5 | 8.5 |
| Average grain size of the rubbery polymer | μm | 0.91 | 0.75 | 0.88 | 0.72 | 0.72 | 0.96 | 1.4 | 0.98 | 0.95 | 1.2 | 1.1 |
| Izod impact strength | kg·cm/cm | 9.8 | 11.3 | 10.5 | 12.5 | 12.1 | 11.3 | 9.2 | 5.1 | 8.8 | 8.7 | 9.5 |
| Gloss | | | | | | | | | | | | |
| Gate part side | % | 90 | 98 | 94 | 98 | 99 | 91 | 84 | 87 | 88 | 87 | 88 |
| End part side | % | 81 | 91 | 86 | 93 | 93 | 84 | 70 | 71 | 72 | 63 | 66 |
| Gloss gradient | — | 1.11 | 1.07 | 1.09 | 1.05 | 1.06 | 1.08 | 1.21 | 1.23 | 1.23 | 1.38 | 1.33 |

We claim:

1. In a method for preparing an impact resistant styrene resin by continuous bulk polymerization of a styrene monomer in the presence as a second component of polybutadiene, styrene-butadiene copolymerization rubber or a mixture thereof, in which the continuous bulk polymerization is carried out using a polymerization line composed of
   (a) a material feed line (I),
   (b) an initial-stage polymerization line (II) following the material feed line (I) and comprising at least one tubular reactor inside which plural mixing elements having no moving parts are fixed,
   (c) a main polymerization line (III) connected to an outlet of the initial-stage polymerization line (II) and comprising at least one tubular reactor inside which plural mixing elements having no moving parts are fixed, and
   (d) a recycle line (IV) which branches between the initial-stage polymerization line (II) and the main polymerization line (III) and returns inside the initial-stage polymerization line (II), and
   recycling a major part of the initial-stage polymerization liquid flow from the initial-stage polymerization line (II) through the recycle line (IV), and polymerizing the non-recycled initial-stage polymerization liquid flow in the main polymerization line (III),
   the improvement which comprises
   providing a reactor having a dynamic mixing structure and having an inlet and outlet and connected to the material feed line (I) by said inlet and to the initial-stage polymerization line (II) by said outlet and carrying out preliminary polymerization while dynamically mixing the polymerization mixture in the reactor having a dynamic mixing structure and wherein the second component has a 5 wt % styrene solution viscosity of 10 to 50 cps.

2. The polymerization method of claim 1 wherein the second component has a 5 wt % styrene solution viscosity of 15 to 30 cps.

3. The polymerization method of any one of claim 1 or 2 wherein the preliminary polymerization is carried out until the polymerization conversion of the styrene monomer becomes 14 to 24 wt % at the outlet of the reactor having a dynamic mixing structure.

4. The polymerization method of any one of claim 1 or 2 wherein the polymerization conversion of the styrene monomer is 10 to 28 wt % at the outlet of the reactor having a dynamic mixing structure, and the polymerization conversion of the styrene monomer in liquid flowing from the initial-stage polymerization line (II) into the main polymerization line (III) is 35 to 55 wt % at the outlet of the initial-stage polymerization line (II).

5. The method of claim 1 wherein the reactor having a dynamic mixing structure is an agitation type reactor having a helical type agitating blade.

6. The polymerization method of claim 5 wherein the preliminary polymerization is carried out until the polymerization conversion of the styrene monomer becomes 14 to 24 wt % at the outlet of the agitation type reactor having a double helical type agitating blade.

7. The polymerization method of claim 5 wherein the polymerization conversion of the styrene monomer is 10 to 28 wt % at the outlet of the agitation type reactor having a double helical type agitating blade, and the polymerization conversion of the styrene monomer in the flowing liquid flowing from the initial-stage polymerization line (II) into the main polymerization line (III) is 35 to 55 wt % at the outlet of the initial-stage polymerization line (II).

8. The method of claim 1 wherein the polymerization mixture in the reactor having a dynamic mixing structure has a Reynolds number in the range of from 2,800 to 4,500.

9. The polymerization method of claim 8 wherein the Reynolds number is 3,100 to 4,300 in the reactor having a dynamic mixing structure.

10. The polymerization method of anyone of claim 8 or 9 wherein the preliminary polymerization is carried out until the polymerization conversion of the styrene monomer becomes 14 to 28 wt % at the outlet of the reactor having a dynamic mixing structure.

11. The polymerization method of anyone of claim 8 or 9 wherein the polymerization conversion of the styrene monomer is 10 to 28 wt % at the outlet of the reactor having a dynamic mixing structure, and the polymerization conversion of the styrene monomer in liquid flowing from the initial-stage polymerization line (II) into the main polymerization line (III) is 35 to 55 wt % at the outlet of the initial-stage polymerization line (II).

12. The method of claim 1 wherein the reactor having a dynamic mixing structure is an agitation type reactor having a double helical type agitating blade and the polymerization mixture within said reactor has a Reynolds number in the range of from 2,800 to 4,500.

13. The polymerization method of claim 12 wherein the second component has a 5 wt % styrene solution viscosity of 15 to 30 cps.

14. The polymerization method of claim 12 wherein the Reynolds number is 3,100 to 4,300 in the agitation type reactor having a double helical type agitating blade.

15. The polymerization method of any one of claim 12, 13 or 14 wherein the preliminary polymerization is carried out until the polymerization conversion of the styrene monomer becomes 14 to 24 wt % at the outlet of the agitation type reactor having a double helical type agitating blade.

16. The polymerization method of any one of claim 12, 13 or 14 wherein the polymerization conversion of the styrene monomer is 10 to 28 wt % at the outlet of the agitation type reactor having a double helical type agitating blade, and the polymerization conversion of the styrene monomer in liquid flowing from the initial-stage polymerization line (II) into the main polymerization line (III) is 35 to 55 wt % at the outlet of the initial-stage polymerization line (III).

17. A process for preparing an impact resistant styrene resin by a continuous bulk polymerization of a styrene monomer with a second component which comprises the steps of
  (a) dynamically mixing and simultaneously prepolymerizing the styrene monomer and the second component, which has a 5 wt % styrene solution viscosity of 10 to 50 cps and is selected from the group consisting of polybutadiene, styrene-butadiene copolymerization rubber and mixtures thereof, to form a prepolymerization mixture,
  (b) polymerizing the prepolymerization mixture in an initial-stage polymerization reactor to form an initial-stage polymerization mixture,
  (c) recycling a portion of the initial-stage polymerization mixture into the initial-stage polymerization reactor, and
  (d) passing the remainder of the initial-stage mixture into a main polymerization reactor and polymerizing therein the remainder of the initial-stage mixture.

18. The polymerization method of claim 17 wherein the second component has a 5 wt % styrene solution viscosity of 15 to 30 cps.

19. The polymerization of claim 17 wherein the polymerization conversion of the styrene monomer in step (a) is 10 to 28 wt % and the polymerization conversion of the styrene monomer in step (b) is 35 to 55 wt %.

20. The polymerization method of claim 17 wherein a recycle ratio R of the initial-stage polymerization mixture is in the range of from 3 to 15 and satisfies the equation $$R = \frac{F1}{F2}$$

wherein F1 is the flow rate (l/hr) of the portion of the initial-stage polymerization mixture which is recycled and F2 is the flow rate (l/hr) of the remainder of initial-stage polymerization mixture which passes into the main polymerization reactor.

21. The polymerization method of claim 17 wherein the recycle ratio R is in the range of from 5-10.

22. The polymerization method of claim 17 wherein dynamic mixing and prepolymerizing are carried out in an agitation reactor having a double helical agitating blade.

23. The polymerization method of claim 22 wherein the Reynolds number of the prepolymerization mixture is in the range of 2,800 and 4,500.

24. The polymerization method of claim 17 wherein the Reynolds number of the prepolymerization mixture is in the range of 3,100 to 4,300.

25. The polymerization method of claim 17 wherein the second component has a 5 wt % styrene solution viscosity of 10 to 50 cps, and dynamic mixing is carried out in an agitation reactor having a double helical agitating blade such that the Reynolds number of the prepolymerization mixture in the range of from 2,800 to 4,500.

26. The polymerization method of claim 25 wherein the Reynolds number is in the range of from 3,100 to 4,300.

27. The polymerization method of claim 26 wherein the polymerization conversion of the styrene monomer in step (a) is 10 to 28 wt % and the polymerization conversion of the styrene monomer in step (b) is 35 to 55 wt %.

* * * * *